United States Patent Office 2,894,874
Patented July 14, 1959

2,894,874

CYCLOSERINE-PYRIDOXINE COMPOSITION

Michael G. Mulinos, Westfield, N.J., assignor to Commercial Solvents Corporation, Terre Haute, Ind., a corporation of Maryland No Drawing. Application November 26, 1956
Serial No. 624,226

6 Claims. (Cl. 167—65)

My invention relates to a composition useful in combating tuberculosis, genito-urinary infections and other diseases in animals and to a process for combating tuberculosis, genito-urinary infections and other diseases in the living animal body. More particularly, my invention relates to a composition containing as the essential active ingredient the antibiotic cycloserine and pyridoxine and to a process for combating tuberculosis, genito-urinary infections and other diseases by treating the living animal body with cycloserine and pyridoxine either with a composition containing cycloserine and pyridoxine as its essential active ingredients or with separate compositions containing cycloserine and pyridoxine as their essential active ingredients.

Cycloserine is the generic name given the compound D-4-amino-3-isoxazolidinone. This material has the following structural formula:

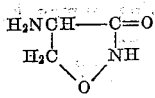

The antibiotic cycloserine is fully described in the Journal of the American Chemical Society, volume 77, page 2345 (1955). A method of producing cycloserine synthetically is described in the Journal of the American Chemical Society, vol. 77, page 2346 (1955), and a method for the fungal production is described in Antibiotics and Chemotherapy, vol. 5, page 183 (1955).

The antibiotic cycloserine has been found to be useful in the treatment of tuberculosis. Its use in this field is described in Antibiotic Medicine, vol. 1, page 80 (1955). It has also been found to be useful in the treatment of other diseases, such as, for example, genito-urinary infections (see Antibiotic Medicine, vol. 1, page 665) and other diseases caused by cycloserine susceptible microorganisms (see Antibiotics Annual 1955–1956, Medical Encyclopedia, Inc., New York, page 158). The one deterrent in the more wide-spread use of the antibiotic cycloserine in the treatment of tuberculosis, genito-urinary infections, and other cycloserine-susceptible diseases has been the appearance in some cases of toxic side reactions manifested by the appearance of hyperreflexia, tremors, and in severe cases by epileptiform type convulsions, following a relatively prolonged course of treatment with the antibiotic material. These toxic side reactions are described in Antibiotic Medicine and Clinical Therapy, vol. 3, No. 4, September 1956, page 258. See also Physician's Bulletin, vol. 21, No. 8, September 1956, at page 227, published by Eli Lilly & Co.

I have now discovered a new composition and process for the treatment of diseases using the antibiotic cycloserine wherein the toxic side reactions are not produced and thus my invention will permit the safer and more wide-spread use of this valuable new antibiotic in the treatment of diseases and particularly in the treatment of tuberculosis where prolonged courses of treatment are required.

I have now discovered that tuberculosis and other diseases can be successfully treated by the use of a combination therapy using both cycloserine and the compound pyridoxine. By the use of regulated amounts of pyridoxine either mixed with the cycloserine or administered separately, I can greatly reduce or even eliminate the appearance of toxic side reactions manifested in the form of epileptic convulsions, hyperreflexia and tremors. When cycloserine is given alone over a prolonged course of treatment, the toxic side reactions usually manifest themselves first as psychogenic symptoms, followed by the hyperreflexia and tremors and eventually, in the more severe cases, as epileptiform convulsions. If, on the other hand, patients are treated by means of my new process using a combination of cycloserine and pyridoxine, these side reactions in most cases never appear even in the form of psychogenic symptoms, but, if they do appear, they rarely go beyond the form of such psychogenic symptoms.

Pyridoxine is the generic name given the compound 2-methyl-3-hydroxy - 4,5 - di(hydroxymethyl) pyridine. This material is also known as vitamin $B_6$. A discussion of pyridoxine, its production, characteristics, and utility appears in the Encyclopedia of Chemical Technology by Kirk and Othmer, vol. 11, page 293, Interscience Encyclopedia, Inc., New York (1953).

Cycloserine, when used alone, is most effective in treating tuberculosis when given in amounts ranging from about 1 to 2 grams per day but it is when used in these amounts that cycloserine occasionally causes the severe toxic side reactions. Reducing the cycloserine dosage to as low as 0.5 gram per day reduces to an insignificant degree the percentage of undesirable side reactions. This reduced dosage, however, does not in every case give as effective results in the treatment of tuberculosis in the human being as is obtained with the larger doses. By employing my new invention and administering pyridoxine, the larger and more effective dosages of cycloserine can be employed without causing toxic side reactions of any type including the minor psychogenic symptoms, hyperreflexia and tremors, as well as the more severe epileptiform convulsions.

The preferred method of administering cycloserine and pyridoxine consists of combining the two agents into a single dosage form, such as a gelatin capsule. Therefore, I prefer to employ capsules containing 0.25 gram of cycloserine and 100 mgs. of pyridoxine. Of course, as I have indicated above, the cycloserine and pyridoxine can be given separately and such a procedure permits flexibility in dosage amounts not permitted by standardized capsules containing fixed amounts of both agents.

The use of my new combination therapy is illustrated by the cases reported below.

A group of chronic, drug-resistant cases of tuberculosis was placed on cycloserine therapy and administered from 1 to 1½ grams of cycloserine per day with the expectation that toxic side reactions would be produced in some of the patients. In due course, two patients developed severe hyperreflexia and one patient developed an epileptiform type of convulsive seizure. From previous experience, it was to be expected that the two cases with hyperreflexia would become worse and eventually lead to the epileptiform type of convulsion within a few days. However, cycloserine administration was continued in the face of these symptoms, but in addition these patients received from 100 to 300 milligrams of pyridoxine a day. The hyperreflexia diminished promptly to disappear completely within a week and the patient with convulsions did not have another such episode, his hyperreflexia also disappearing completely. In one of the two patients having hyperreflexia but no convulsions, pyridoxine administration was discontinued while cycloserine therapy was continued, and within a few days the hyperreflexia reappeared and was as marked as ever. At this point, pyridoxine administration was reinstituted and the hyperreflexia again promptly disappeared and did not reappear as the patient continued on cycloserine therapy and his tuberculosis lesions rapidly cleared.

As a further example of my new invention, 15 chronic tuberculosis patients were treated for 6 months with cycloserine in the amount of 0.5 gram per day. At the end of this time most of the patients in the group had improved clinically, but the rate of improvement had reached a plateau and the patients were regaining their health at a reduced rate. At this point the dose of cycloserine was doubled so that each patient was being administered 1.0 gram per day and within a few weeks of the start of the treatment with the increased amount of cycloserine, two of the patients developed hyperreflexia demonstrating a lack of induced tolerance to cycloserine built up by the previous, long-term treatment. Upon introduction of pyridoxine in the amount of 200 mgs. per day, the hyperreflexia subsided and disappeared.

As indicated above, daily doses ranging from about 1 to about 2 grams of cycloserine per day and 100 to about 300 mgs. of pyridoxine per day are generally employed in the treatment of tuberculosis, genito-urinary infections, etc. Generally, I have found that doses as low as 250 mgs. and as high as about 6 grams per day of cycloserine can be employed with doses of 50 to 500 mgs. of pyridoxine. By maintaining blood levels of cycloserine ranging from about 20 micrograms of cycloserine per ml. of serum to about 60 micrograms per ml. of serum, an effective amount for combating tuberculosis and most genito-urinary infections can be considered to be present.

Obviously, cycloserine and pyridoxine can be incorporated in a number of different unit dosage forms and also, it is obvious that more than one unit dosage form can be administered at the same time. It is obvious also that the amount of cycloserine in the unit dosage form can be varied but, as indicated above, I prefer to employ a capsule dosage form containing 0.25 gram of cycloserine and 100 mgs. of pyridoxine. The materials can be combined in capsule form, tablet form, powder form, etc. for oral ingestion. The composition can also take the form of a solution or suspension suitable for parenteral administration. The active ingredients can be admixed with diluents and/or tableting adjuvants such as corn starch, lactose, talc, stearic acid, magnesium stearate, gums, etc. Any of the customary tableting materials used in pharmaceutical practice can be employed where there is no incompatibility with the active ingredients.

As mentioned previously, cycloserine and pyridoxine can be formulated in separate dosage forms for administration separately. This permits flexibility in the amounts of each material administered and also permits administration of pyridoxine to be started when it appears that a toxic side reaction is starting in a patient receiving the cycloserine alone. Dosage forms containing cycloserine alone and pyridoxine alone can be prepared as described above.

In addition to use of the cycloserine in its free form, cycloserine can be employed in the form of an acid addition salt such as the sulphate, hydrochloride, etc., or in the form of a salt of a base such as the calcium salt, magnesium salt, etc. Similarly pyridoxine can be employed in the free base form or in the form of an acid addition salt, such as, for example, pyridoxine hydrochloride. I intend for the terms "cycloserine" and "pyridoxine" to include such salt forms hereinabove described.

The scope of my invention is intended to include all equivalents obvious to those skilled in the art and I intend for such equivalents to be included within the scope of the following claims.

Now having described my invention, what I claim is:

1. A composition for combating cycloserine-susceptible diseases which comprises as the essential active ingredients, the antibiotic cycloserine and pyridoxine.

2. A composition for combating tuberculosis which comprises as the essential active ingredients, from about 250 mgs. to about 6 grams of cycloserine and from about 50 to about 500 mgs. of pyridoxine.

3. A process for combating cycloserine-susceptible diseases in the living human body which comprises administering to such living human body, a daily dosage of from about 250 mgs. to 6 grams of cycloserine and from about 50 to about 500 mgs. of pyridoxine.

4. A process of combating cycloserine-susceptible diseases in the living human body which comprises administering to such living human body a therapeutic composition comprising as the essential active ingredients, the antibiotic cycloserine and pyridoxine.

5. A process of combating cycloserine-susceptible diseases in the living human body which comprises administering to such living human body separate doses of cycloserine and pyridoxine.

6. A process of combating tuberculosis in the living human body which comprises administering to such living human body separate doses of cycloserine and pyridoxine in such amounts that the total daily amount of cycloserine ranges from about 250 mgs. to 6 grams and the total daily amount of pyridoxine ranges from about 50 to 500 mgs.

References Cited in the file of this patent

Physicians' Desk Reference, 10th ed., page 481. Copyright 1955.

Neilands: Arch. Biochem. and Biophysics, 62:1, pp. 151–162, May 1956.

Weinberg: Bacteriological Reviews, 21:1, March 1957, pp. 46–68, esp. 56, 64, 66.

Biehl et al.: P.S.E.B.M., 85:3, March 1954, pp. 389–392.

Vilter et al.: J. Lab. and Clin. Med., 42:3, September 1953, pp. 335–357.